United States Patent Office 2,809,941
Patented Oct. 15, 1957

---

2,809,941

PRODUCING PHOSPHORUS CONTAINING AMINO RESINS AND FLAMEPROOFING ORGANIC TEXTILES

Wilson A. Reeves and John D. Guthrie, New Orleans, La., assignors to the United States of America as represented by the Secretary of Agriculture No Drawing. Application September 3, 1953, Serial No. 378,437

19 Claims. (Cl. 260—2)

(Granted under Title 35, U. S. Code (1952), sec. 266)

A non-exclusive, irrevocable, royalty-free license in the invention herein described, for all governmental purposes, throughout the world, with the power to grant sublicenses for such purposes, is hereby granted to the Government of the United States of America.

This invention relates to new phosphorus and nitrogen containing polymers, processes for their production and processes of employing these polymers in the flameproofing of certain organic fibrous materials.

This application is a continuation in part of our co-pending applications, Serial Nos. 283,743 filed April 22, 1952, now Patent No. 2,668,096, and 283,744 filed April 22, 1952, now abandoned.

Our co-pending application, Serial No. 378,435, filed of even date, relates to certain processes employing such polymers.

In general this invention relates to polymers capable of being produced by the reaction of a phosphorus compound of the group tetrakis(hydroxymethyl) phosphonium chloride, tris(hydroxymethyl) phosphine oxide and mixtures thereof, with a monomeric nitrogen compound which contains at least two members of the group, hydrogen atoms and methylol (—CH$_2$OH) radicals, attached to trivalent nitrogen atoms; and to processes of reducing the combustibility of hydrophilic fibrous organic materials.

We have discovered that tetrakis(hydroxymethyl) phosphonium chloride and tris(hydroxymethyl) phosphine oxide,

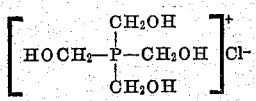

and

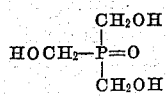

react with monomeric aliphatic compounds containing at least two members of the group hydrogen atoms and methylol radicals, CH$_2$OH, attached to trivalent nitrogen atoms, to produce polymers. The polymers which are produced are cross-linked phosphorus and nitrogen containing polymers in which the recurring structural units each contain a phosphorus atom that is a component of a radical of the group tetramethylene phosphonium chloride, (—CH$_2$)$_4$PCl, and trimethylene phosphine oxide, (—CH$_2$)$_3$P=O, and is linked to at least two trivalent nitrogen atoms by connecting structures of the group —CH$_2$— and —CH$_2$OCH$_2$—. Where the polymerization reaction is conducted in the presence of an amount of a basic compound equivalent to the amount of chlorine present in the amount of tetrakis(hydroxymethyl) phosphonium chloride used, or where the polymers are produced by the reaction of tris(hydroxymethyl) phosphine oxide, the recurring structural units of the polymers are composed of phosphorus atoms which are members of a trimethylene phosphine oxide group and which are linked to trivalent nitrogen atoms by connecting structures of the group consisting of —CH$_2$OCH$_2$— and —CH$_2$—.

Such polymers can be produced in the form of solid synthetic resins. Such resins can be deposited on the surfaces and/or in the interstices of hydrophilic fibrous organic materials, i. e., organic materials which absorb or adsorb water on most of their surface area. When such resins are so deposited, they reduce the combustibility of hydrophilic fibrous organic materials and resist removal by laundering and the like chemical treatments. Such resins can be deposited on the surfaces of non-hydrophilic materials to form flame resistant coatings.

We have also discovered that tetrakis(hydroxymethyl) phosphonium chloride and tris(hydroxymethyl) phosphine oxide react with polymeric aliphatic compounds containing at least two members of the group consisting of hydrogen atoms and methylol (—CH$_2$OH) radicals attached to trivalent nitrogen atoms, other than the aminoalkylated celluloses disclosed in our application Serial No. 283,743. Such reactions provide valuable new processes and products.

In the case of polypeptides, such as proteins, and polymers such as poly(hexamethylene adipamide), the reaction provides an improved process of coagulating and precipitating the polypeptide. In addition, the products of this reaction are valuable new polypeptides containing recurring structural units composed of phosphorus atoms which are members of a pentavalent phosphorus radical of the group consisting of a trimethylene phosphine oxide and a tetramethylene phosphonium chloride radical, and which phosphorus atoms are linked to trivalent nitrogen atoms by connecting structures of the group consisting of —CH$_2$OCH$_2$— and —CH$_2$—.

In the case of open chain polyamines such as tetramethylenepentamine the reaction produces valuable new polyamines exhibiting, to a rather widely variable, controlled degree, the properties of a thermosetting non-combustible polymer. Such polymers contain the phosphorus and nitrogen groups of the type described above.

In the case of monomeric alicyclic compounds containing at least two members of the group consisting of hydrogen atoms and methylol (—CH$_2$OH) radicals attached to trivalent nitrogen atoms, such as cyclohexylamine the reaction produces valuable new flame-resistant polymers containing alicyclic rings and the above described type of phosphorus and nitrogen groups.

In the case of monomeric aromatic compounds containing at least two members of the group consisting of hydrogen atoms and methylol (—CH$_2$OH) radicals attached to trivalent nitrogen atoms, such as aniline the reaction produces valuable new flame-resistant polymers containing aromatic rings and the above described type of phosphorus and nitrogen groups.

In the case of cyclic imines such as ethylenimine and its homologs, the reaction produces unique and valuable new polymers containing the above described type of phosphorus and nitrogen groups, plus, in the case of ethylenimine and its homologs, groups in which the same phosphorus groups are linked to nitrogen atoms by connecting structures of the general group,

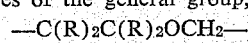

and —CH$_2$— in which R represents radicals of the group consisting of hydrogen and alkyl radicals. Such polymers exhibit the unique property of sorbing relatively large amounts of water and swelling during the sorbtion.

In the case of an organic compound containing a single member of the group consisting of hydrogen atoms and methylol groups attached a trivalent nitrogen atom, such as dimethylamine, N,N-diethyl methylolamine, N-allyl cyclohexylamine, or phthalamide, the reaction produces valuable new compounds containing a recurring structural unit composed of phosphorus atoms which are members of a pentavalent phosphorus radical of the group consisting of a trimethylene phosphine oxide and a tetramethylene phosphonium chloride radical, and which phosphorus atoms are linked to trivalent nitrogen atoms by connecting structures of the group consisting of, —$CH_2OCH_2$— and —$CH_2$—. New compounds of this type in which the phosphorus atoms are attached to a plurality of methylol radicals react with the various classes of nitrogen compounds in the same way that the phosphorus compounds from which they were prepared react; and those in which the phosphorus atom is attached to a single methylol radical react in the same way, except that they are monofunctional.

We have also discovered that incompletely polymerized, i. e., water or organic solvent soluble polymers of such phosphorus compounds with monomeric organic compounds containing at least two members of the group consisting of hydrogen atoms and methylol (—$CH_2OH$) radicals attached to trivalent nitrogen atoms can be quickly and advantageously insolubilized by reacting the polymers with ammonia. The ammonia can be employed in the form of an aqueous solution. This insolubilization can be accomplished at low temperature and can be used to combine additional nitrogen into the polymer.

The compounds, tetrakis(hydroxymethyl) phosphonium chloride and tris(hydroxymethyl) phosphine oxide, are hereinafter referred to by their initials THPC and THPO. The term "phosphorus compounds" is employed to refer to THPC or THPO, or mixtures of THPC and THPO. The term "nitrogen compound" is employed to refer to monomeric aliphatic compounds containing at least two members of the group consisting of hydrogen atoms and methylol (—$CH_2OH$) radicals attached to trivalent nitrogen atoms.

Illustrative examples of suitable nitrogen compounds include: (1) amino compounds such as urea and urea derivatives like methylol ureas, alkylated methylol ureas, oxalyl urea and hydantoin, melamine and melamine derivatives like methylol melamines, alkylated methylol melamines, alkyl substituted melamines where the alkyl group or groups are either saturated or unsaturated and guanidine, hydrazine and hydroxylamine, (2) aliphatic amines such as ethylamine, ethylenediamine, allylamine and cetylamine, (3) amides such as formamide, butyramide, octadecylamide and acrylamide and (4) amino acids such as glycine, lysine and arginine.

The polymers provided by this invention can be formed by reacting the phosphorus compounds with: (1) mixtures of the nitrogen compounds; (2) one or more of the nitrogen compounds and formaldehyde. In the latter case, the phosphorus compounds can be incompletely reacted with the nitrogen compounds prior to reaction with formaldehyde, or the nitrogen compounds can be incompletely reacted with formaldehyde prior to reaction with the phosphorus compounds, or the phosphorus compounds, the nitrogen compounds and formaldehyde can be concurrently reacted.

Hydrophilic fibrous organic materials are rendered less combustible by impregnating the materials with aqueous solutions, or homogeneous dispersions, of the respective monomers, or partially reacted monomers, and curing the impregnated materials.

Melamine, urea, and water-soluble methylolmelamines and methylolureas are preferred members of the nitrogen compounds; and THPC and mixtures of THPC and THPO are preferred members of the phosphorus compounds.

The polymers provided by this invention can be produced in the form of liquids or solids and can be molded by the conventional techniques of molding thermosetting resins. These polymers are valuable materials for use in the production of molded synthetic plastic articles, such as buttons, food containers, electrical insulators and the like; synthetic coatings such as protective coatings, and paints, varnishes and the like having a reduced flammability due to the presence of some of the polymers; adhesives, such as the amino resin type adhesives having a reduced flammability due to the presence of some of the polymers; paper treating resins; textile resins; and the like.

The terms "parts" and "percent" as used herein refer to parts or percent by weight.

Condensation polymers of THPC and THPO with the nitrogen compounds are preferably prepared by agitating a mixture of the phosphorus and nitrogen compounds in water while heating until polymerization occurs. The preferred relative amounts of phosphorus and nitrogen compounds used to polymerize can be calculated by conventional methods used for condensation polymerization by assuming that: (1) THPC is tetrafunctional and THPO is trifunctional, (2) one methylol group of the phosphorus compound condenses with one hydrogen or methylol group attached to a trivalent nitrogen atom of the nitrogen compound, and (3) THPC is converted to THPO in the presence of neutral carbonates like calcium carbonate, alkali carbonates like sodium carbonate, alkali metal hydroxides, tertiary amines like triethanolamine, and bases in general.

For example the mole ratio range for polymerizing THPC with melamine is one mole of THPC per 0.2 to 2 moles of the amino compound with the preferred range of 0.3 to 1.3 mole of the amino compound per mole of THPC. When THPO is polymerized with melamine the mole ratio range is one of THPO per 0.15 to 2 moles of the amino compound with the preferred range of 0.3 to 1.0 mole of the amino compound per mole of THPO. The THPO can be made in situ as described above. To polymerize THPO with urea the mole ration range is one mole of THPO per 0.25 to 3.0 moles of urea with the preferred range of 0.6 to 2.0 moles of urea per mole of THPO. To polymerize THPO with acrylamide the mole ratio range is one mole of THPO per 0.5 to 4.0 moles of acrylamide with the preferred mole ration range of 1.0 to 2.5 moles of acrylamide per mole of THPO.

THPC and/or THPO will copolymerize with materials which are in themselves capable of polymerizing (e. g., methylolmelamine) over an extremely wide range. For example trace quantities of THPC and/or THPO added to essentially a 100% aqueous solution of methylolmelamine will co-polymerize with the methylolmelamine to produce a new phosphorus and nitrogen containing resin. These new phosphorus and nitrogen polymers are formed until there exists in the aqueous solution about 4 moles of the THPO or THPC per one mole of the methylolmelamine.

Polymerization reactions conducted in accordance with the process of this invention can be carried to the extent of producing solid, liquid, or gel-like polymers. The liquid polymers can be isolated from the reaction medium by dissolving in the reaction medium a selective solvent for water. Methyl, ethyl, and isopropyl alcohols are preferred selective solvents. The polymerization of isolated partial polymers can be completed by conventional procedures of thermally completing the polymerization of partially polymerized thermosetting monomers.

The polymerization reaction can be conducted in the presence of minor amounts of water soluble acidic or basic reacting compounds. Preferred acid reacting compounds are acetic or hydrochloric acid and the acid catalysts conventionally used in the production of amino resins. The alkali metal carbonates, bicarbonates and triethanolamine are preferred basic reacting compounds.

The combustibility of organic fibrous materials can be reduced in accordance with this invention by impregnating the fibrous materials with an aqueous solution, or uniform suspension or dispersion, of the monomeric compounds, or the partially polymerized monomers formed by reacting the monomeric compounds until partial polymerization occurs; and curing the impregnated materials at the elevated temperatures conventionally used for curing fibrous organic materials.

The process of this invention can be used to reduce the combustibility of substantially any hydrophilic fibrous material such as cotton, rayon such as viscose rayon, ramie, jute, wool, paper, cardboard, and the like materials which can be impregnated with a liquid, dried, and cured.

Where the organic fibrous material consists of a textile fiber or fabric, the hydrochloric acid resulting from THPC in the partial polymerization reaction or in the complete polymerization is preferably neutralized with a water soluble basic or base forming compound. The alkali metal bicarbonates and carbonates, guanidine carbonate, triethanolamine, diethanolamine, and urea are preferred basic reacting compounds. Diethanolamine reacts with the phosphorus compounds to become a part of the polymeric material. The basic or base forming compound or compounds can be added to the reaction medium before, during or after the partial polymerization of the monomers.

Where a textile is being impregnated, it is of advantage to remove the excess impregnating liquid by passing the textile through squeeze rolls adjusted to apply a comparatively extremely high pressure prior to drying and curing the impregnated textile. It is also of advantage to dry the textile at a temperature of about 70° C. to 110° C. before it is cured at a temperature of from about 110° C. to 180° C.

The degree of flameproofing imparted to a textile by these phosphorus and nitrogen resins can be varied from a low degree to a very high degree by varying the amount of polymer put in the fabric.

Some advantages of flameproofing textiles in accordance with this invention are: textiles treated by this process are flame resistant, glow resistant, shrink resistant, wrinkle resistant, rot resistant, and mildew resistant; the effects of the treatment are permanent, and resistant to laundering, dry cleaning, boiling alkali solutions and acid treatments.

The following examples are illustrations of the invention:

*Example 1*

A mixture of tetrakis(hydroxymethyl) phosphonium chloride and about ⅓ part of melamine was mixed with approximately 1⅓ parts of water. The mixture was agitated for about 20 minutes at from 80° to 90° C. and a clear solution resulted. The hydrochloric acid formed during the reaction was neutralized by adding calcium carbonate until the rate of evolution of carbon dioxide decreased.

The neutralized clear solution polymerized almost immediately. After curing at about 110° C. for about 1 hour, the resulting thermosetting resin was noncombustible and contained 12.5% phosphorus, 2.21% chlorine, and 24.1% nitrogen.

*Example 2*

A mixture of tetrakis(hydroxymethyl) phosphonium chloride and 0.3 part of melamine was agitated with about 3.5 parts of water at 65° C. until a clear solution was formed. Sodium carbonate was slowly stirred into the warm solution until the rate of evolution of carbon dioxide decreased. The resultant solution remained clear when cooled to room temperature. Heating a relatively thin layer of solution for about 10 minutes at about 130° C. produced a clear noncombustible thermosetting resin.

After standing about 24 hours at room temperature a portion of the clear solution in a container in which it presented a relatively small surface area in comparison with its volume became a clear sirup which was no longer soluble in water.

*Example 3*

A mixture of tetrakis (hydroxymethyl) phosphonium chloride and 0.4 part of melamine was mixed with approximately 1.5 parts of water containing a minor amount of acetic acid and diammonium phosphate. The mixture was agitated for about 20 minutes at about 80° to 90° C. resulting in a clear solution containing a small amount of suspended solid. The solid was removed by centrifugation.

Heating a thin layer of this clear solution for 10 minutes at 110° C. produced a substantially clear resin insoluble in: aqueous 15% formaldehyde; aqueous 20% sodium hydroxide; and glacial acetic acid. The resin was noncombustible.

On standing about 24 hours at room temperature the clear solution gelled. The gel was cured at 110° C. for 2 hours and produced a noncombustible thermosetting resin containing 12.1% phosphorus and 21% nitrogen and 11% chloride.

*Example 4*

A mixture of tetrakis (hydroxymethyl) phosphonium chloride and 1 part of guanidine was agitated with about 2 parts of water at about 25° C. until a clear solution was produced.

After about 72 hours at room temperature the clear solution became a clear viscous sirup which was no longer soluble in water.

*Example 5*

A mixture of tetrakis (hydroxymethyl) phosphonium chloride and about 1 part of urea was agitated with about 2 parts of water at about 100° C. for about 15 minutes, then cured at 120° C. for 25 minutes. The resultant product was a hard and clear water soluble material.

*Example 6*

Tetrakis (hydroxymethyl) phosphonium chloride was mixed with approximately 1 part of a mixture of melamine and about 3 molar portions of formaldehyde which had been reacted sufficiently, by heating, to form a water soluble mixture and the resulting mixture was mixed with approximately 2 parts of water. The resulting aqueous mixture was agitated at about 60° C. for about 15 minutes at which time it became a dough-like mass. When heated for about 30 minutes at about 80° to 90° C. and allowed to stand for about 24 hours at room temperature the dough-like mixture was converted to a water insoluble polymer.

*Example 7*

A cotton print cloth was mercerized in about 20% lye, washed, run through squeeze rolls then padded with a solution prepared by mixing tetrakis (hydroxymethyl) phosphonium chloride with about 0.8 part of a mixture of melamine and formaldehyde, which had been partially reacted until the mixture was water soluble, and with about 2 parts of water. The impregnated cloth was dried at 55° to 65° C. and cured for 4 minutes at 150° C.

After the fabric was washed in hot tap water for 10 minutes and dried, it would do the 180° angle flame test and was not stiff.

*Example 8*

A similar cotton cloth was flame-proofed by the process described in Example 7, except that about 0.4 part of urea per part of tetrakis (hydroxymethyl) phosphonium chloride was included in the solution with which the cotton was impregnated.

The resultant fabric had a similar flame resistance and was tendered only slightly.

*Example 9*

A cotton print cloth was padded with a neutral solution made by heating a mixture of six parts of tetrakis (hydroxymethyl) phosphonium chloride with two parts of melamine and sufficient sodium carbonate to make to pH 7. The padded fabric was first dried at 70° C. then cured four minutes at 150° C.

After washing the fabric would do the 170° flame tests.

*Example 10*

An eighty square cotton print cloth was mercerized in approximately 20% sodium hydroxide, washed well, then run through squeeze rolls to remove the excess water, and then padded with a solution consisting of one part tetrakis (hydroxymethyl) phosphonium chloride, about 0.8 part of a mixture of melamine and formaldehyde (previously reacted to produce a water soluble mixture), about 0.4 part of urea, and about 2 parts by weight of water. The padded fabric was dried at 55° to 65° C. and cured 4 minutes at 150° C.

After two treatments with 0.1% Igepon T solution at 60 C. and an acid sour with 0.02% sodium silicofluoride, the fabric was flameproof.

The treated fabric before and after Igepon T treatment exhibited wrinkle resistance.

The treated fabric was subjected to the vertical flame test before and after the Igepon T treatment. Before washing the length of rip after burning was 3⅝", after washing the length of rip after burning was 3¹³⁄₁₆". There was no afterglow in either case. Considering the weight of the fabric, the above values are well within the maximum values recommended by the Quartermaster Corps for flameproofing cotton cloth.

*Example 11*

A mixture of one part tris(hydroxymethyl) phosphine oxide and one part of melamine with five parts of water was heated to about 80° C. until a clear solution formed. When the clear solution was spread out in a thin layer and heated at 120° C., a clear hard polymer formed which was insoluble in water, alcohol, alkali or acids.

*Example 12*

A mixture of one part of tris(hydroxymethyl) phosphine oxide and one part of urea was dissolved in 4 parts of water and then boiled for 60 minutes. This produced a clear jell. When the jell was heated at 140° C. for 20 minutes a hard insoluble polymer was produced.

*Example 13*

One part of tris(hydroxymethyl) phosphine oxide and 1.3 parts of tetrakis(hydroxymethyl) phosphonium chloride were mixed with one part of melamine in 5 parts of H₂O and heated to boil. A clear solution formed and then with 5–10 minutes of boiling, jellation occurred. The jell was clear; when it was heated to 130° C. it became hard and insoluble.

*Example 14*

Cotton fabric (8 oz. twill) was padded with a solution made from 3 parts of tris(hydroxymethyl) phosphine oxide, 13 parts of tetrakis(hydroxymethyl) phosphonium chloride, 10.5 parts of urea, 10.5 parts of a water soluble trimethylol melamine and 63 parts of water. The solution had a pH of 6.8. The impregnated fabric was dried for 4 minutes at 85° C. The dry fabric was heated 4 minutes at 140° C. then washed with water. The so treated fabric contained 15.7% resin and the resin remained on the fabric throughout repeated severe launderings. The treated fabric did not burn when held over an open flame and when the flame was removed it did not glow. The fabric retained 75% of its original warp tear strength and 100% of its original warp tensile strength. A considerable amount of wrinkle resistance was exhibited by the fabric.

*Example 15*

Cotton fabric (8 oz. twill) was padded using two dips and two nips with a solution made from 16.4 parts of THPC, 9.9 parts of a trimethylolmelamine, 10.3 parts of urea and 3.0 parts of triethanolamine (the purpose of the triethanolamine was to stabilize the solution and to convert some of the THPC to THPO). The impregnated fabric was dried 4 minutes at 85° C. then cured by heating 4 minutes at 140° C. The fabric was then washed and dried. The dry fabric contained 16.4% resin and was glowproof, flameproof and wrinkle resistant. A small amount of cationic softener applied to this fabric improved the hand of the fabric and did not affect the flameproofing.

*Example 16*

Rayon worsted fabric was treated exactly as described for cotton twill in Example 5 except that the solution was made from 20 parts of THPC, 12.1 parts of a trimethylolmelamine, 12.5 parts of urea and 3.5 parts of triethanolamine. The treated rayon contained about 20% resin and had a very high degree of wrinkle resistance, it was flameproof (passed Federal specification #CCC-T-191b. No. 5702). It retained essentially all of its original tensile and tear strength.

*Example 17*

Wool worsted fabric wetted with a solution containing 16 parts THPC, 10 parts of a trimethylolmelamine, 12 parts of urea, one part of diethanolamine and 51 parts of water, then passed through squeeze rolls, dried at 95° C. and cured 4 minutes at 140° C. The fabric contained 20% resin and was flameproof. The fabric hand was about the same as before it was treated.

*Example 18*

Ramie fabric was treated in exactly the same solution and using the same procedure as described in the above example. The ramie fabric contained 25% resin and was flameproof.

*Example 19*

Filter paper was padded through a solution containing the same reagents and the same amounts of reagents described in Example 15. The paper was dried at 70° C. then cured 4 minutes at 140° C. It contained 14.7% resin after it had been washed and dried. It was flame-resistant.

*Example 20*

Burlap was wetted in the solution described in Example 17 then passed through squeeze rolls, dried at 100° C., then cured 4 minutes at 145° C. After washing and drying the burlap contained 10% resin and was flameproof.

*Example 21*

When 3.5 parts of cetylamine dissolved in 30 parts of 60% ethanol were added to 2 parts of THPC dissolved in 12 parts of 80% ethanol containing 0.3 part of sodium carbonate, a low melting polymer came down almost immediately. The white polymer which would melt at less than 100° C. was soluble in Stoddard solvent but insoluble in water and in ethanol. The polymer contained 5.6% phosphorus and 4.4% nitrogen.

*Example 22*

A low melting polymer was obtained by mixing aqueous solutions containing one part of THPC in 4 parts of water and one part of cyclohexylamine in 4 parts of water. When the polymer was heated for 15 to 20 minutes at 145° C. it formed a light brown liquid which would solidify or remelt at 70 to 80° C. The polymer was insoluble in water but was readily soluble in dioxane.

We claim:

1. A process of producing polymers, which comprises, reacting phosphorus compounds, selected from the group consisting of tetrakis(hydroxymethyl) phosphonium chloride, tris(hydroxymethyl) phosphine oxide, and mixtures thereof, with monomeric compounds containing at least two members of the group consisting of hydrogen atoms and methylol (—CH₂OH) radicals attached to trivalent nitrogen atoms by heating at a temperature from about room temperature to about 150° C. in the presence of a solvent.

2. Compositions for treating hydrophilic fibrous organic materials selected from the group consisting of cotton, jute, ramie, hemp, wool, rayon, and mixtures thereof, which compositions comprise, homogeneous aqueous mixtures consisting essentially of partially reacted mixtures of phosphorus compounds, selected from the group consisting of tetrakis(hydroxymethyl) phosphonium chloride, tris(hydroxymethyl) phosphine oxide, and mixtures thereof, with monomeric compounds containing at least two members of the group consisting of hydrogen atoms and methylol (—CH$_2$OH) radicals attached to trivalent nitrogen atoms.

3. Processes of treating hydrophilic fibrous organic materials selected from the group consisting of cotton, jute, ramie, hemp, wool, rayon, and mixtures thereof, which processes comprise, impregnating said fibrous organic materials with homogeneous aqueous mixtures consisting essentially of partially reacted mixtures of phosphorus compounds, selected from the group consisting of tetrakis(hydroxymethyl) phosphonium chloride, tris(hydroxymethyl) phosphine oxide, and mixtures thereof, with monomeric compounds containing at least two members of the group consisting of hydrogen atoms and methylol (—CH$_2$OH) radicals attached to trivalent nitrogen atoms and thermally inducing the completion of the reaction of said partially reacted mixtures with which said fibrous organic materials are impregnated.

4. A process of producing cross linked polymers comprising reacting phosphorus compounds, selected from the group consisting of tetrakis(hydroxymethyl) phosphonium chloride, tris(hydroxymethyl) phosphine oxide, and mixtures thereof, in the presence of a solvent and an amount of a basic compound equivalent to the amount of chlorine present in the amount of tetrakis(hydroxymethyl) phosphonium chlorine used, with monomeric compounds containing at least two members of the group consisting of hydrogen atoms and methylol (—CH$_2$OH) radicals attached to trivalent nitrogen atoms by heating at a temperature from about room temperature to about 150° C.

5. A process of producing cross linked polymers comprising reacting tris(hydroxymethyl) phosphine oxide with monomeric compounds containing at least two members of the group consisting of hydrogen atoms and methylol (—CH$_2$OH) radicals attached to trivalent nitrogen atoms by heating at a temperature from about room temperature to about 150° C. in the presence of a solvent.

6. A process of producing cross linked polymers comprising reacting phosphorous compounds of the group consisting of tetrakis(hydroxymethyl) phosphonium chloride, tris(hydroxymethyl) phosphine oxide, and mixtures thereof with primary alkylamines by heating at a temperature from about room temperature to about 150° C. in the presence of a solvent.

7. A process of producing cross-linked polymers comprising heating tetrakis(hydroxymethyl) phosphonium chloride with monomeric compounds containing at least two members of the group consisting of hydrogen atoms and methylol (—CH$_2$OH) radicals attached to trivalent nitrogen atoms at a temperature from about room temperature to about 150° C. in the presence of a solvent.

8. A process of reducing the flammability of textiles selected from the group consisting of cotton, jute, ramie, hemp, wool, rayon, and mixtures thereof which comprises impregnating the textile with an aqueous solution of tetrakis(hydroxymethyl) phosphonium chloride, trimethylolmelamine, urea and triethanolamine, drying the material and heating the dried impregnated material for from about 130 to 160° C. for from about 1 to 5 minutes, using the longer times with the lower temperatures.

9. A condensation polymer obtained by heating a mixture of tris(hydroxymethyl) phosphine oxide and tetrakis(hydroxymethyl) phosphonium chloride with nitrogen compounds selected from the group consisting of melamine, urea, water-soluble methylol melamine, and water-soluble methylolureas, in the presence of a solvent, at a temperature of from about room temperature to about 150° C.

10. A process of producing cross-linked polymers containing pentavalent phosphorus radicals comprising heating in the presence of a solvent, a mixture of tetrakis(hydroxymethyl) phosphonium chloride, tris(hydroxymethyl) phosphine oxide, and monomeric compounds containing at least two members of the group consisting of hydrogen atoms and methylol (—CH$_2$OH) radicals attached to trivalent nitrogen atoms at a temperature of from about room temperature to 150° C.

11. A condensation polymer of tris(hydroxymethyl) phosphine oxide and melamine obtained by heating tris(hydroxymethyl) phosphine oxide and melamine together at a temperature from about room temperature to about 150° C. in the presence of a solvent.

12. A condensation polymer of tris(hydroxymethyl) phosphine oxide and cetylamine obtained by heating tris(hydroxymethyl) phosphine oxide and cetylamine together at a temperature from about room temperature to 150° C. in the presence of a solvent.

13. A condensation polymer of tetrakis(hydroxymethyl) phosphonium chloride, a water soluble methylolmelamine, urea, and diethanolamine obtained by heating tetrakis(hydroxymethyl) phosphonium chloride, a water-soluble methylolmelamine, urea, and diethanolamine at a temperature from about room temperature to about 150° C. in the presence of a solvent.

14. A process for producing cross-linked polymers comprising heating, in the presence of a solvent, a phosphorus compound selected from the group consisting of tetrakis(hydroxymethyl) phosphonium chloride, tris(hydroxymethyl) phosphine oxide, and mixtures thereof with at least two different monomeric compounds containing at least two members of the group consisting of hydrogen atoms and methylol (—CH$_2$OH) radicals attached to trivalent nitrogen atoms at a temperature from about room temperature to about 150° C.

15. A condensation polymer of tetrakis(hydroxymethyl) phosphonium chloride with a compound selected from the group consisting of melamine, urea, water soluble methylolmelamines, and water soluble methylolureas obtained by heating tetrakis(hydroxymethyl) phosphonium and a compound selected from the group consisting of melamine, urea, water soluble methylolmelamines, and water soluble methylureas to a temperature from about room temperature to about 150° C. in the presence of a solvent.

16. A condensation polymer of a phosphorus compound selected from the group consisting of tetrakis(hydroxymethyl) phosphonium chloride, tris(hydroxymethyl) phosphine oxide, and mixtures thereof with cyclohexylamine obtained by heating the said phosphorus compound with cyclohexylamine, in the presence of a solvent, at a temperature from about room temperature to about 150° C.

17. A condensation polymer of a phosphorus compound selected from the group consisting of tetrakis(hydroxymethyl) phosphonium chloride, tris(hydroxymethly) phosphine oxide, and mixtures thereof and an alicyclic amine obtained by heating said phosphorus compound with the alicyclic amine, in the presence of a solvent, at a temperature from about room temperature to about 150° C.

18. A condensation polymer of a phosphorus compound selected from the group consisting of tetrakis(hydroxymethyl) phosphonium chloride, tris(hydroxymethyl) phosphine oxide, and mixtures thereof and an aromatic amine obtained by heating said phosphorus compound with the aromatic amine, in the presence of a solvent, at a temperature from about room temperature to about 150° C.

19. A condensation polymer of a phosphorus compound selected from the group consisting of tetrakis(hydroxymethyl) phosphonium chloride, tris(hydroxymethyl) phosphine oxide, and mixtures thereof with a cyclic imine obtained by heating said phosphorus compound with the cyclic imine, in the presence of a solvent, at a temperature from about room temperature to about 150° C.

References Cited in the file of this patent

UNITED STATES PATENTS

| | | |
|---|---|---|
| 2,606,902 | Parker et al. | Aug. 12, 1952 |
| 2,668,096 | Reeves et al. | Feb. 2, 1954 |